May 3, 1960 W. HASTINGS ET AL 2,935,572
ELECTRICAL SIGNALING SYSTEM
Filed Sept. 15, 1958
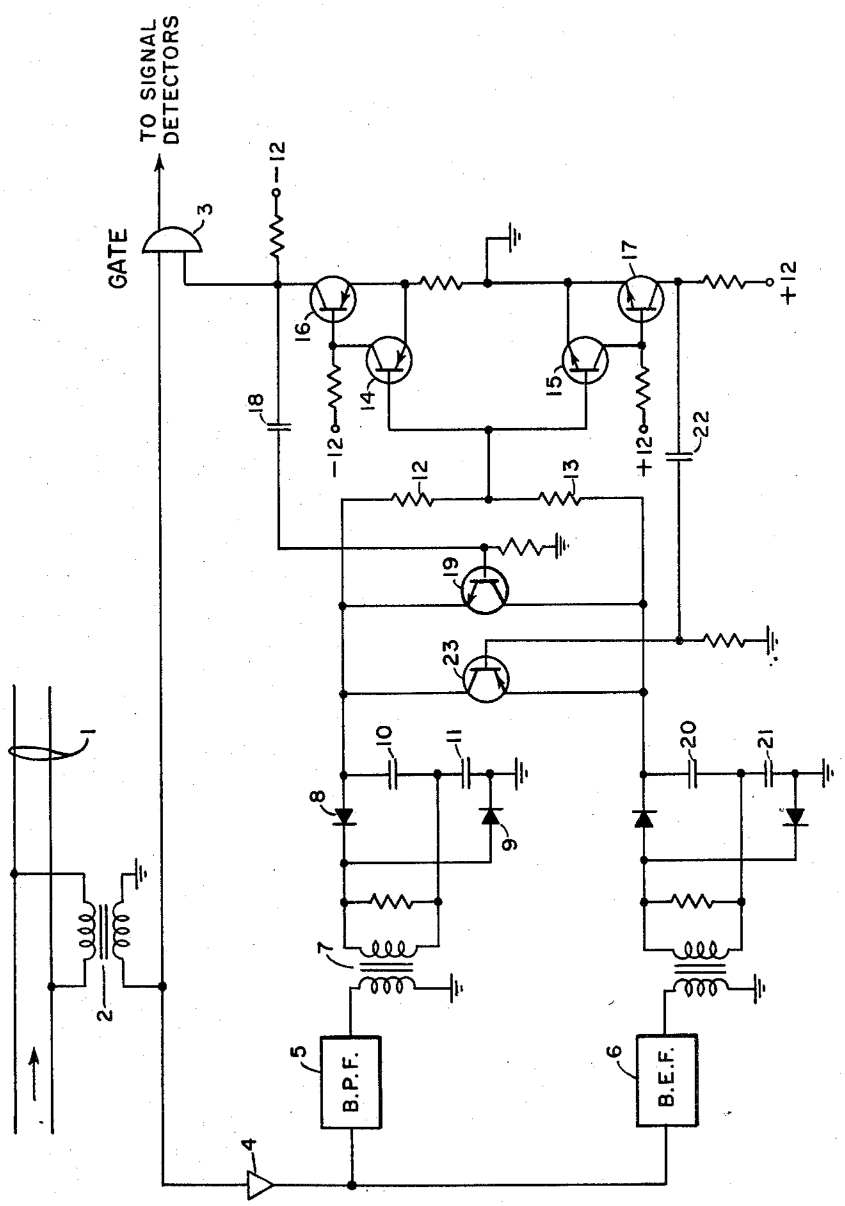
INVENTORS.
WILLIAM HASTINGS
DONALD M. RAGER, JR.
BY F. W. Hanson
ATTORNEY

United States Patent Office 2,935,572

Patented May 3, 1960

2,935,572

ELECTRICAL SIGNALING SYSTEM

William Hastings, Rochester, and Donald M. Rager, Jr., Buffalo, N.Y., assignors to General Dynamics Corporation, Rochester, N.Y., a corporation of Delaware Application September 15, 1958, Serial No. 760,940

7 Claims. (Cl. 179—84)

This invention relates in general to electrical signaling systems and, more particularly, to electrical signaling systems of the type in which one or more signaling frequency currents and complex currents, which may include the frequencies used for signaling, are transmitted over a common channel. Such a signaling system is particularly useful for interoffice signaling in telephone systems.

The signal receivers in a voice frequency signaling telephone system are conventionally provided with voice guard circuits which prevent the false operation of the signal detection circuits therein by speech or noise. In one of the most successful designs of voice guard circuitry, received signals within the signaling frequency band are separated from received signals having a frequency outside of the band, the separated signals are rectified and integrated to produce potentials of opposite polarity, the potentials are added algebraically, and the received signals are coupled to the signal detection circuits only if the potential corresponding to the rectified signal frequency exceeds the potential corresponding to the rectified signals outside the signaling band by a predetermined amount. The slow release characteristics of the above-described voice guard circuit, due to the relatively long time required to discharge the capacitors in the integrator networks, is objectionable in applications where radio links subject to noise crashes are used between offices, in applications where voice frequency signals are transmitted from a subscriber station having a high ambient noise background, or in multiplex applications where a single signal receiver is used to scan a plurality of channels for signals. In any of the above-described applications, a long release or "hangover" time can cause the loss of or the false registration of a signal.

Accordingly, it is the general object of this invention to provide a new and improved signal receiver for use in systems of the above-described type.

It is a more particular object of this invention to provide a new and improved voice guard circuit which has a fast release characteristic.

The signal receiver which forms the subject matter of this invention comprises a voice guard circuit and a two-input gate for passing received signals to signal detecting circuits only when the second input of the gate is energized by the voice guard circuit. Received signals are coupled to the first input of the gate, to the input of a band-pass filter, and to the input of a band-elimination filter, which filters are designed to pass received signals having a frequency within the signaling frequency band and received signals having a frequency outside said signaling frequency band, respectively. The signals passed by the band-pass filter are rectified and integrated by a first network to produce a potential of one polarity and the signals passed by the band-elimination filter are rectified and integrated by a second network to produce a potential of opposite polarity. The potentials appearing at the outputs of the first and second networks are added algebraically to produce a control potential which is applied to the inputs of first and second trigger circuits, which may be transistor or tube trigger circuits or electromechanical relays. The first trigger circuit is triggered to its "on" condition to energize the second input of the above-mentioned gate when the control potential is of said one polarity and exceeds a first predetermined voltage value, and is triggered to its "off" condition when the control potential decreases below said first predetermined voltage value. The second trigger circuit is triggered to its "on" condition when the control potential is of said opposite polarity and exceeds a second predetermined voltage value, and is triggered to its "off" condition when the control potential decreases below said second predetermined voltage value. When either one of the first or second trigger circuits is triggered to its "off" condition, a switch is operated to complete a low impedance path between the output of the first and second networks for the purpose of quickly discharging the capacitors in the integrator networks. Thus, the first trigger circuit operates when the signal exceeds the noise by a predetermined amount, 10 db for example, the second trigger circuit operates on noise crashes, and the capacitors in the integrator networks are quickly discharged when either one of the trigger circuits is restored to its "off" condition.

Further objects and advantages of the invention will become apparent as the following description proceeds, and features of novelty which characterize the invention are pointed out in particularity in the claims annexed to and forming a part of this specification.

For a better understanding of the invention, reference may be had to the accompanying drawing which shows circuit details of a portion of a signal receiver.

Although its use is not restricted thereto, the illustrated signal receiver can be used in the incoming register in the electronic switching system disclosed in copending application Serial No. 721,241, filed March 13, 1958, and assigned to the same assignee as the present invention. As disclosed in that application, voice frequency and speech signals are transmitted from the calling line terminating unit over one pair of the four-wire transmission network interconnecting the line terminating units and the incoming registers of the system, and the assigned incoming register is controlled to connect to the four-wire network. Therefore, the illustrated transmission line 1 may be one pair of a four-wire transmission network and voice frequency and speech signals are transmitted over line 1.

As illustrated, signals appearing on transmission line 1 are coupled by transformer 2 to one input of the two-input voice guard gate 3, which may be of any well known type, and to the input of amplifier 4, which is preferably of the emitter follower or cathode follower type so as to reduce the bridging loss of the voice guard circuit on the transmission line. The amplified signals appearing at the output of amplifier 4 are coupled to the input of band-pass filter 5 and to the input of band-elimination filter 6. Filter 5 is designed to pass only the signals having a frequency within the signaling frequency band and filter 6 is designed to pass only the signals having a frequency outside the signaling frequency band. In the system disclosed in the above-identified application, the signaling frequency band is from 1700 to 2900 c.p.s., which is in the upper portion of the voice band and thus liable to noise simulation.

The signals passed by band-pass filter 5 are coupled by transformer 7 to the conventionally designed rectifying and integrating voltage doubler network comprising diodes 8 and 9 and capacitors 10 and 11. The negative D.-C. potential developed across this network and coupled to the upper terminal of resistor 12 is proportional to the total energy in the signal band. The signals produced by band-elimination filter 6 are rectified and integrated in the same manner except that the D.-C. potential applied to the lower terminal of resistor 13 is of positive polarity. The positive D.-C. potential is, of course, proportional to the total energy in the noise band. Filters 5 and 6 are so designed that, for a given broad band noise, the energy in the signal integrator equals the energy in the noise integrator. Further, filter 5 is preferably designed in such manner that it compensates for the fact that more noise may be received at one frequency than another so that, for a given broad band noise, a constant signal to noise ratio across the signal band is maintained at the output of the integrating networks.

The negative D.-C. potential and the positive D.-C. potential appearing at the outputs of the signal and noise integrator circuits, respectively, are added algebraically by resistors 12 and 13 to produce a control potential which is applied to the base electrodes of transistors 14 and 15. Transistors 14 and 16 form an emitter coupled trigger circuit in which transistor 16 is normally conductive and transistor 14 is non-conductive. Transistor 14 is rendered conductive to trigger the circuit to its "on" condition only when its base electrode becomes negative with respect to its emitter which is held at a negative potential by the conduction of transistor 16. When transistor 14 becomes conductive, transistor 16 is rendered non-conductive and the emitter potentials of transistors 14 and 16 become more positive to thereby lock the circuit in its "on" condition. When transistor 16 becomes non-conductive, the resulting negative potential at its collector serves to energize the second input of voice guard gate 3 and thus allow the received signals applied to the first input of said gate to pass to the signal detection circuits. In the preferred embodiment of the invention, resistors 12 and 13 are so proportioned that the trigger circuit comprising transistors 14 and 16 is triggered to its "on" condition when the signal voltage is 10 db, or more, greater than the noise voltage.

When the transmitted signals cease, the negative control potential at the junction point of resistors 12 and 13 decreases to the point where transistor 14 is rendered non-conductive and transistor 16 is thereby triggered conductive to block the transmission of signals through voice guard gate 3 to the signal detectors. The positive-going potential swing at the collector of transistor 16 is also coupled through capacitor 18 to the base of transistor 19 to render transistor 19 momentarily conductive and thus close a low impedance path across resistors 12 and 13 and quickly discharge capacitors 10, 11, 20, and 21 of the integrator networks.

The trigger circuit comprising transistors 15 and 17 is provided in the circuit for the purpose of quickly discharging the integrating network capacitors after the receipt of a noise crash. If the control potential appearing at the junction point of resistors 12 and 13 becomes more positive than the potential of the emitter of transistor 15, the trigger circuit is triggered to its "on" condition in which transistor 15 is conductive and transistor 17 is non-conductive. At the termination of the noise crash, the positive control potential decreases to the point where transistor 15 is rendered non-conductive and transistor 17 is triggered conductive. The negative-going potential swing at the collector of transistor 17 is coupled through capacitor 22 to the base of transistor 23 to render transistor 23 momentarily conductive and thus close a low impedance path across resistors 12 and 13.

Thus, the release or hangover time of the illustrated voice guard circuit following the receipt of either signals or crashes of noise is negligible. Further, since the integrating capacitors are discharged after each operation of the circuit, the integration period is lengthened as a further precaution against false operation of the signal detection circuits by short bursts of noise.

While there has been shown and described what is at present considered to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. A signal receiver for receiving at least one signal frequency current and complex currents which include said signal frequency, said receiver comprising a band-pass filter for passing received currents of a frequency equal to said signal frequency and a band-elimination filter for passing received currents of a frequency other than said signal frequency, a first network for rectifying and integrating signals passed by said band-pass filter to produce a potential of one polarity, a second network for rectifying and integrating signals passed by said band-elimination filter to produce a potential of opposite polarity, means for adding algebraically the potentials appearing at the outputs of said first and second networks to produce a control potential, a trigger circuit having first and second conditions of operation, means for triggering said trigger circuit to its second operated condition when said control potential is of said one polarity and exceeds a predetermined voltage value and for restoring said trigger circuit to its first operated condition when said control potential decreases below said predetermined value, and means responsive to the restoration of said trigger circuit for momentarily completing a low impedance path between the output of said first network and the output of said second network.

2. A signal receiver for receiving at least one signal frequency current and complex currents which include said signal frequency, said receiver comprising a band-pass filter for passing received currents of a frequency equal to said signal frequency and a band-elimination filter for passing received currents of a frequency other than said signal frequency, a first network for rectifying and integrating signals passed by said band-pass filter to produce a potential of one polarity, a second network for rectifying and integrating signals passed by said band-elimination filter to produce a potential of opposite polarity, means for adding algebraically the potentials appearing at the outputs of said first and second networks to produce a control potential, first and second trigger circuits each having first and second conditions of operation, means for triggering said first trigger circuit to its second operated condition when said control potential is of said one polarity and exceeds a first predetermined voltage value and for restoring said first trigger circuit to its first operated condition when said control potential decreases below said first predetermined value, and means for triggering said second trigger circuit to its second operated condition when said control potential is of said opposite polarity and exceeds a second predetermined voltage value and for restoring said second trigger circuit to its first operated condition when said control potential decreases below said second predetermined value.

3. The signal receiver of claim 2 including means responsive to the restoration of said first trigger circuit for momentarily completing a low impedance path between the output of said first network and the output of said second network.

4. The signal receiver of claim 2 including means responsive to the restoration of said second trigger circuit for momentarily completing a low impedance path between the output of said first network and the output of said second network.

5. In combination, a transmission line, a signal receiver comprising a guard circuit and a two-input gate, means for transmitting a band of signaling frequencies over said transmission line, said guard circuit comprising a band-pass filter for passing signals having a frequency within said signaling frequency band and a band-elimination filter for passing signals having a frequency outside said signaling frequency band, means for coupling signals from said transmission line to one input of said gate and to the inputs of said band-pass and band-elimination filters, a first network for rectifying and integrating signals passed by said band-pass filter to produce a potential of one polarity, a second network for rectifying and integrating signals passed by said band-elimination filter to produce a potential of opposite polarity, means for adding algebraically the potentials appearing at the outputs of said first and second networks to produce a control potential, a trigger circuit having first and second conditions of operation, means coupling said trigger circuit and the second input of said gate for enabling said gate to pass signals coupled to its first input only when said trigger circuit is in its second operated condition, means for triggering said trigger circuit to its second operated condition when said control potential is of said one polarity and exceeds a predetermined voltage value and for restoring said trigger circuit to its first operated condition when said control potential decreases below said predetermined value, and means responsive to the restoration of said trigger circuit for momentarily completing a low impedance path between the output of said first network and the output of said second network.

6. In combination, a transmission line, a signal receiver comprising a guard circuit and a two-input gate, means for transmitting a band of signaling frequencies over said line, said guard circuit comprising a band-pass filter for passing signals having a frequency within said signaling frequency band and a band-elimination filter for passing signals having a frequency outside said signaling frequency band, means for coupling signals from said transmission line to one input of said gate and to the inputs of said filters, a first network for rectifying and integrating signals passed by said band-pass filter to produce a potential of one polarity, a second network for rectifying and integrating signals passed by said band-elimination filter to produce a potential of opposite polarity, means for adding algebraically the potentials appearing at the outputs of said first and second networks to produce a control potential, first and second trigger circuits each having first and second conditions of operation, means coupling said first trigger circuit and the second input of said gate for enabling said gate to pass signals coupled to its first input only when said first trigger circuit is in its second operated condition, means for triggering said first trigger circuit to its second operated condition when said control potential is of said one polarity and exceeds a first predetermined voltage value and for restoring said first trigger circuit to its first operated condition when said control potential decreases below said first predetermined value, means for triggering said second trigger circuit to its second operated condition when said control potential is of said opposite polarity and exceeds a second predetermined voltage value and for restoring said second trigger circuit to its first operated condition when said control potential decreases below said second predetermined value, and means responsive to the restoration of said second trigger circuit for momentarily completing a low impedance path between the output of said first network and the output of said second network.

7. The combination of claim 6 including means responsive to the restoration of said first trigger circuit for momentarily completing a low impedance path between the output of said first network and the output of said second network.

References Cited in the file of this patent

UNITED STATES PATENTS 2,739,298 Lovell ---------------- Mar. 20, 1956